(12) United States Patent
Hurwitz et al.

(10) Patent No.: US 10,469,121 B2
(45) Date of Patent: Nov. 5, 2019

(54) NON-LINEAR SHUNT CIRCUIT FOR THIRD ORDER HARMONIC REDUCTION IN RF SWITCHES

(71) Applicant: Newport Fab, LLC, Newport Beach, CA (US)

(72) Inventors: Paul D. Hurwitz, Irvine, CA (US); Roda Kanawati, Irvine, CA (US)

(73) Assignee: Newport Fab, LLC, Newport Beach, CA (US)

( * ) Notice: Subject to any disclaimer, the term of this patent is extended or adjusted under 35 U.S.C. 154(b) by 21 days.

(21) Appl. No.: 15/709,841

(22) Filed: Sep. 20, 2017

(65) Prior Publication Data

US 2019/0089398 A1    Mar. 21, 2019

(51) Int. Cl.
| | |
|---|---|
| *H04B 1/44* | (2006.01) |
| *H04B 1/04* | (2006.01) |
| *H04B 15/02* | (2006.01) |

(52) U.S. Cl.
CPC .............. *H04B 1/44* (2013.01); *H04B 1/0475* (2013.01); *H04B 15/02* (2013.01)

(58) Field of Classification Search
CPC ........ H04B 1/44; H04B 1/0475; H04B 15/02; H03K 17/162; H03K 17/693; H01L 21/77; H01L 27/1203; H01L 21/823475; H01L 28/75; H01L 27/0251; H01L 27/088; H01L 28/20; H01Q 1/50; H01Q 1/526; H01Q 1/243; H02H 9/045
See application file for complete search history.

(56) References Cited

U.S. PATENT DOCUMENTS

| | | | |
|---|---|---|---|
| 2011/0316062 A1* | 12/2011 | Kondo ................... | H01L 29/93 257/312 |
| 2013/0194158 A1* | 8/2013 | Chen ...................... | H01Q 1/50 343/876 |
| 2014/0009203 A1* | 1/2014 | Cebi ..................... | H03K 17/162 327/379 |
| 2014/0335801 A1 | 11/2014 | Bolten et al. | |

* cited by examiner

*Primary Examiner* — Jianxun Yang
(74) *Attorney, Agent, or Firm* — Bever, Hoffman & Harms, LLP

(57) ABSTRACT

A non-linear shunt circuit is coupled in a shunt-type configuration (e.g., parallel to an RF switch shunt branch) between a main signal line and ground in an RF circuit, and includes a harmonic cancellation element (HCE) (e.g., back-to-back diodes or diode-connected FETs) configured to cancel third harmonics generated on the main signal line by operation of an RF switch. The RF switch includes a series branch made up of multiple FETs coupled in series in the main signal line between a transmitter/receiver circuit and an antenna. The HCE is coupled to the main signal line either by way of a mid-point node or an input/output terminal of the RF switch's series branch. The non-linear shunt circuit also includes optional protection circuits that provide frequency-independent impedance through the HCE. Various techniques (e.g., active biasing) are optionally utilized to increase effectiveness to a wider range of the switch input power levels.

4 Claims, 9 Drawing Sheets

NON-LINEAR SHUNT CIRCUIT FOR THIRD ORDER HARMONIC REDUCTION IN RF SWITCHES

FIELD OF THE INVENTION

The present invention relates to radio frequency (RF) electronics, and more particularly to distortion compensation circuitry for cancelling harmonic distortion in RF circuitry.

BACKGROUND OF THE INVENTION

FIG. 12 is a simplified diagram showing a conventional RF circuit utilized in handsets and other wireless devices including a solid state RF switch that passes received RF signals at a frequency $f_2$ from an antenna to a receiver circuit via a low noise amplifier (LNA) circuit (not shown), and also passes signals at a frequency $f_1$ from a transmitter via a power amplifier (PA) circuit (not shown) to the antenna. Because solid state RF switches are not perfectly linear, intermodulation (frequency mixing) of the two frequency components $f_1$ and $f_2$ generates false signals $f_3$ that are passed via the main signal line to the receiver circuit. The false signals $f_3$ are typically generated at harmonic frequencies (i.e., integer multiples of the source frequencies, such as $2*f_1$), but may also be generated at sum and difference frequencies (e.g., such as $2*f_1-f_2$). These false signals can manifest themselves as noise on allowed communication bands. Third-order harmonic intermodulation products are a particular issue for new proposed carrier aggregation uplink standards. For example, future carrier aggregation implementations require that inputs of 25 dBm (316 mW) generate less than −110 dBm (8 fW) at mixing frequencies.

Various conventional harmonic suppression techniques, such as the use of diplexers connected at the antenna port and better isolation between the transmission and receiver signal paths, can be used to mitigate the linearity issues associated with the use of solid state RF switches, but these conventional approaches incur associated cost and performance penalties.

A conventional series-type harmonic cancellation technique is taught in U.S. Pub. App. No. 2014/0335801 A1, which discloses a harmonic cancellation device formed by standard circuit elements placed in series with the series branch of a solid-state RF switch. There are at least two problems associated with this series-type approach. First, the on-state series switch branch has very low voltage across it (e.g., a typical GSM-capable switch branch, realized in a monolithic silicon technology, with 24 dBm input power would have only around 140 mV across it). As a result, to achieve significant current through the series-type harmonic cancellation device, the device must be configured to exhibit relatively low impedance, which requires the use of relatively large device sizes that significantly increase the resulting size of the host RF circuit. Fundamentally, harmonic distortion can also be improved by reducing the on-state resistance of the switch's series branch, but this makes even less voltage headroom available for the series-type harmonic cancellation device. Second, such series-type harmonic cancellation devices will be subjected to the full voltage generated across the off-state series switch branch, which can be very high (i.e., 40-70V) under mismatch (e.g., high Voltage Standing Wave Ration (VSWR)) conditions. Most individual circuit elements in RF switch silicon technology cannot withstand such voltages, so protection devices (e.g., stacks of many FETs) must be placed in series with the series-type harmonic cancellation device. Some of the already-small on-state voltage is dropped across these protection devices, making implementation even more challenging.

What is needed is a harmonic cancellation technique for RF circuits that overcomes the deficiencies of conventional approaches set forth above. In particular, what is needed is a harmonic cancellation device that facilitates the transmission of higher RF signal voltages on a main signal line, allows the use of smaller, high impedance devices that take less chip area and have less impact on the core RF switch performance, and is not adversely affected by Ron reduction.

SUMMARY OF THE INVENTION

The present invention introduces a shunt-type harmonic cancellation approach in which a harmonic cancellation element (HCE) is coupled between a main signal line and ground (i.e., in a shunt-type configuration) and is configured to cancel third harmonics in RF signals transmitted on the main signal line. Coupling the HCE in the novel shunt-type configuration of the present invention facilitates the transmission of higher RF signal voltages across the HCE (i.e., in comparison to conventional series-type approaches), which facilitates greater compensating harmonic cancellation. In addition, coupling the HCE to the main signal line in the shunt-type configuration allows the use of smaller, high impedance devices that take less chip area and have less impact on the core RF switch performance. Further, unlike the series-type approach, the shunt-type harmonic cancellation approach of the present invention is not adversely affected by Ron reduction (i.e. there is not an inherent trade-off between harmonic cancellation and reduced voltage drop across the series branch of an RF switch).

In a generalized practical embodiment, a radio frequency (RF) circuit implements the shunt-type harmonic cancellation approach using a non-linear shunt circuit connected by way of a first conductive path between a main signal line and a ground potential (i.e., in a shunt-type configuration). The main signal line is coupled between a transmitter/receiver circuit (i.e., either a transmitter circuit or a receiver circuit) and an antenna (or other element in the RF signal chain) by way of a solid state RF switch. The RF switch includes a series branch made up of multiple series-connected FETs that are operably integrated into the main signal line and configured such that the FETs selectively turn on to pass RF signals between the transmitter/receiver circuit and the antenna in accordance with actuation of a switch control signal. In one embodiment, the non-linear shunt circuit is coupled to the main signal line by way of a mid-point node in the RF switch's series branch in order to protect the HCE from high voltage swings when the series branch is in an off (non-transmitting) state.

According to an aspect of the invention, the non-linear shunt circuit includes the HCE and one or more optional protection circuits that cooperatively function to remove third harmonics of the RF signal that are generated on the main signal line by switching operations performed by the RF switch. According to alternative specific embodiments, the HCE is implemented using either a series of back-to-back diodes, or CMOS devices (transistors) configured (e.g., by way of drain-to-gate connections) to act as diodes that are configured to partially cancel third harmonics generated on the main signal line. That is, the nonlinearity of the HCE and protection circuit path is of comparable magnitude, but out of phase with, the nonlinearity of the main RF switch.

The one or more protection circuits function to limit current through the HCE such that the HCE operates in a bias regime in which its nonlinearity is favorable for cancellation of the main switch branch nonlinearity. The protection circuits also function to ensure that voltage across the HCE does not exceed safe operating conditions. According to other alternative practical embodiments, the protection circuit(s) are implemented using passive elements such as capacitors, resistors, or a combination thereof. In another exemplary embodiment, the protection circuit(s) utilize actively controlled circuit elements (e.g., one or more FETs) that are controlled using a protection bias voltage. In these embodiments, the actively controlled circuit elements are maintained in a relatively high resistance state (e.g., the FETs are maintained in a substantially non-conductive state by the protection bias voltage). An advantage of using actively controlled circuit elements is that this approach facilitates tuning the impedance applied to the HCE, thereby facilitating variance of the power level at which harmonic cancellation is achieved by the non-linear shunt circuit.

According to other practical embodiments, the protection circuit elements may be connected to various nodes of the HCE in order to facilitate enhanced control over protection of the HCE. For example, the HCE may be formed by gate-to-drain-connected FETs, and the protection circuit may be implemented using both a capacitor coupled between the HCE and the main signal line, and a pair of resistors respectively connected between the main signal line and the gate terminals of the FETs. A second capacitor may be coupled between the HCE and ground. In this case, the resistors affect the voltage applied across the HCE, and thus provide another degree of freedom that can be used to tune the non-linear shunt circuit to provide harmonic cancellation.

According to another practical embodiment, the HCE comprises multiple pairs of back-to-back-connected diodes, where each pair of diodes (or gate-to-drain connected FETs) is configured with a different turn-on voltage (i.e., such that a first diode pair turns on at a first voltage level, a second diode pair turns on at a second voltage level that is higher than the first voltage level, etc.). This configuration addresses situations where the $3^{rd}$ order harmonic response of the HCE is sensitive to switch input power such that effective cancellation of the main switch branch will occur for a limited power range. By configuring the HCE with several parallel branches, each branch including a pair of back-to-back diodes having a uniquely different turn-on voltage, the present embodiment functions to extend the effectiveness of the HCE to a wider range of the switch input power levels.

According to another embodiment, the HCE is actively controlled using one or more HCE bias voltages in order to effectively tune (adjust) the power range over which the HCE provides third harmonic cancellation. In a preferred embodiment, the non-linear shunt circuit utilizes high impedance protection circuits to isolate the HCE from high RF voltage levels generated on the main signal line, and the RF circuit includes an HCE bias control circuit that is configured using known techniques to generate the active (HCE bias) voltage(s). In an exemplary embodiment, active HCE biasing is achieved by way of forming the HCE using a pair of transistors (FETs) that are diode-connected (i.e., gate-to-drain) and configured such that direct current HCE bias voltages are respectively applied to the gate terminals of the two transistors, whereby the turn-on voltage of the HCE is effectively tuned in accordance with a voltage level of the HCE bias voltages. In a practical embodiment, the direct current active bias voltages are transmitted to the diode-connected transistors by way of high value resistors that serve to provide RF blocking, and the transistor drain and gate terminals are coupled by way of capacitors (protection circuits) to avoid a direct DC connection between the bias voltages and the main RF line. A small potential is optionally utilized to bias the body of the lower transistor forming the HCE to achieve harmonic cancellation over a wider power range.

According to another practical embodiment, non-linear shunt circuits of the present invention are physically placed (positioned on the fabricated IC chip) adjacent to and in parallel with an associated shunt branch of the RF circuit's RF switch. Although the non-linear shunt circuit of the present invention may be utilized in conjunctions with RF switches that do not include shunt branches, most RF switch applications utilize shunt branches, and placing each non-linear shunt circuit adjacent to an associated switch shunt branch minimizes the amount of additional chip area required to implement the shunt-type harmonic cancellation approach of the present invention.

In yet another embodiment, the non-linear shunt circuit of the present invention is implemented by way of integrating the HCE with an RF switch shunt branch to provide even further space-saving advantages (i.e., by way of obviating the need for separate protection circuits). In one embodiment, the HCE is connected in parallel with one or more of the RF switch shunt branch FETs. During operation, the RF switch shunt branch FETs are turned off when the corresponding series branch of the RF switch is turned on, whereby at least some of the shunt branch FETs serve the role of the protection circuits to limit voltage across the HCE during harmonic cancellation operations. Conversely, the RF switch shunt branch FETs are turned on when the corresponding series branch of the RF switch is turned off, whereby the HCE is bypassed by the one or more parallel-connected shunt branch FETs.

According to yet another alternative embodiment, a non-linear shunt circuit includes a two-part protection circuit. In an exemplary embodiment the protection circuit is implemented using a combination of twelve series-connected FETs and associated resistors that are divided into two groups of six, with the HCE connected in parallel with a lower group of the FETs between a central node and ground. A gate bias voltage is supplied to the gate terminals of the twelve FETs by way of associated (first) resistors, and the bodies of the twelve FETs are coupled to a body bias voltage by way of associated (second) resistors. Of course, the protection circuit may be implemented using any number of series connected FETs or configured using any of the other protective circuit configurations described herein. In a specific embodiment, the HCE is implemented using native (low-threshold voltage) diode-connected FETs that are coupled between two additional resistors. This configuration provides a significant (e.g., 20 dBm) improvement in third harmonic cancellation over conventional approaches under normal operating conditions. The effective input power range over which the non-linear shunt circuit is capable of cancelling third harmonics is increased by way utilizing parallel-connected diodes having different turn-on voltages.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in RF circuitry. The following description is presented to enable one of ordinary skill in the art to make and use the invention as provided in the context of a particular application and its requirements. As used herein, directional terms such as "upper" and "lower" are intended to provide relative positions for purposes of description, and are not intended to designate an absolute frame of reference. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
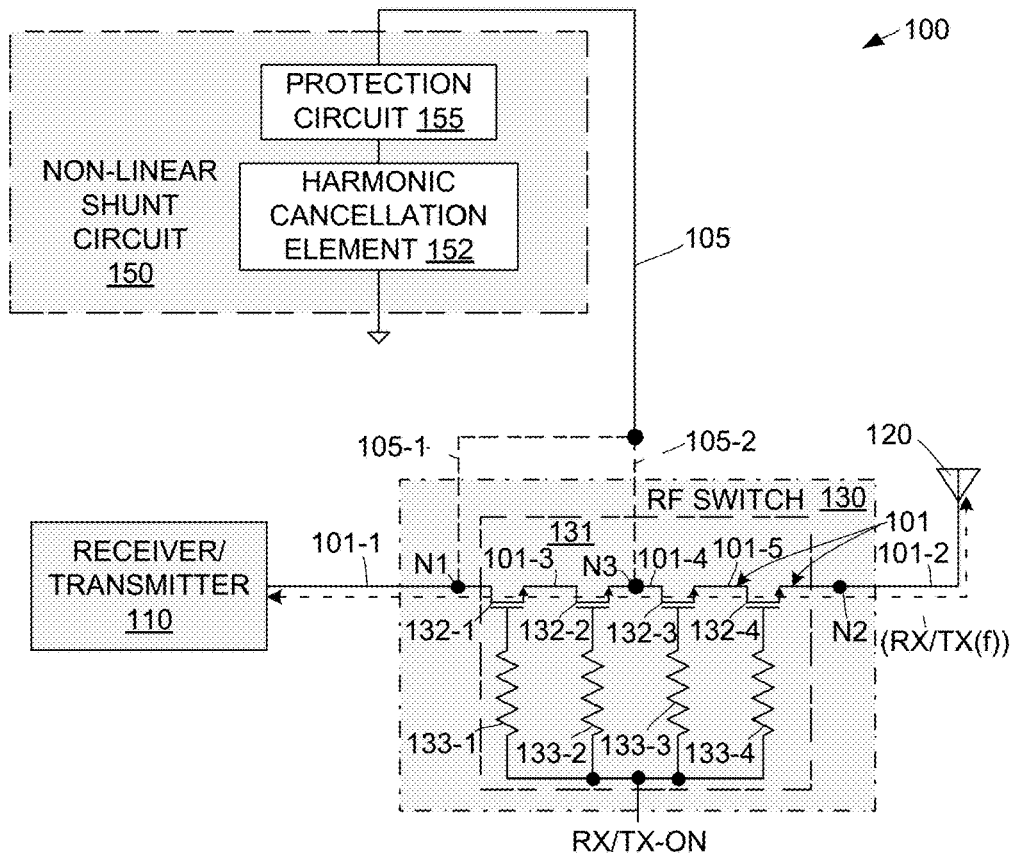
FIG. 1 is a block/schematic diagram showing a generalized RF circuit according to a practical embodiment of the present invention.

FIG. 1 shows a generalized RF circuit 100 including a main signal line 101 coupled between a transmitter/receiver circuit 110 and an antenna 120, an RF switch 130 that controls the transmission of RF signals RX/TX on a main signal line 101, and a non-linear shunt circuit 150 that functions to remove third harmonics generated by RF switch 130. In a preferred embodiment all components of RF circuit 110 are produced using known semiconductor fabrication techniques on a semiconductor (e.g., silicon) substrate. For example, transmitter/receiver circuit 110, RF switch 130 and non-linear shunt circuit 150 comprise solid state components (e.g., field-effect transistors, FETs and other components) fabricated on a substrate using known front-end CMOS fabrication techniques, and main signal line 101 is generated using metal sections and via structures formed over the substrate using known back-end CMOS fabrication techniques.

RF switch 130 comprises a series branch 131 that is depicted as having a first (e.g., input) node N1 connected to transmitter/receiver circuit 110 by way of a first section 101-1 of main signal line 101, and as having a second (e.g., output) node N2 connected to antenna 120 by way of a second section 101-2 of main signal line 101. Those skilled in the art will recognize that other circuit elements (e.g., couplers, tuners, etc.) may be included on main signal line 101, and thus RF switch 130 is described as being coupled to transmitter/receiver circuit 110 by way of line section 101-1, and coupled to antenna 120 by way of line section 101-2. Series branch 131 of RF switch 130 is implemented using FETs and associated resistors to selectively pass RF signals RX/TX on main signal line 101 between transmitter/receiver circuit 110 and antenna 120 in accordance with a switch control signal RX/TX-ON. In the generalized embodiment RF switch 130 is depicted as being implemented using four series-connected FETs 132-1 to 132-4, although those skilled in the art will recognize that series branch 131 could be implemented using any number of transistors. Series-connected FETs 132-1 to 132-4 are operably connected to (integrated into) main signal line 101 such that sections of main signal line 101 are effectively formed between adjacent series-connected FETs. For example, a third line section 101-3 extends between FETs 132-1 and 132-2, a fourth line section 101-4 extends between FETs 132-2 and 132-3, and a fifth line section 101-5 extends between FETs 132-3 and 132-4. Switch control signal RX/TX-ON is applied to the gate terminals of FETs 132-1 to 132-4 by way of resistors 133-1 to 133-4, which are sized and formed in accordance with known techniques. RF switch 130 may also include an optional shunt branch (not shown) that functions as described below. Such shunt branches are typically included in RF switches, but are not required for the inventive concept to be effective.

Non-linear shunt circuit 150 includes a harmonic cancellation element (HCE) 152 and one or more optional protection circuits 155 that are connected in series by way of a conductive path (wire or other metallization structure) 105 between a main signal line 101 and a ground potential (e.g., Vss or other fixed low voltage). Conductive path sections 105-1 and 105-2 are indicated as dashed-line sections to indicate that the connection of non-linear shunt circuit 150 to main signal line 101 may be made at a terminal of RF switch 130 (e.g., at input node N1 by way of conductive path section 105-1), or optionally may be made to an intermediate node within series branch 132 (e.g., to mid-point node N3 on line section 101-4 by way of conductive path section 105-2). An added advantage provided by connecting non-linear shunt circuit 150 by way of mid-point N3 is that this arrangement helps to protect HCE 152 from high voltage swings when series branch 132 is in the off-state.

Figure 2A:
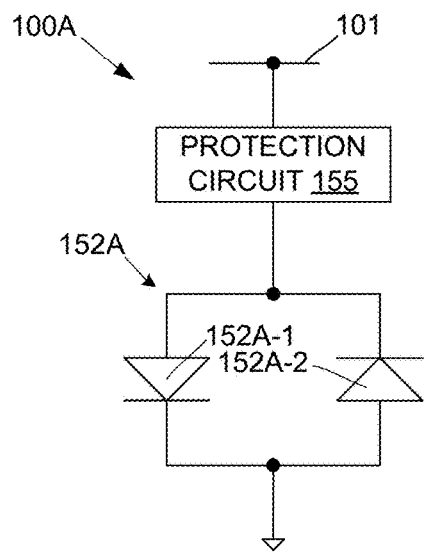
FIGS. 2(A) and 2(B) are simplified diagrams showing partial RF circuits showing alternative basic HCE configurations according to alternative exemplary embodiments.
Figure 2B:
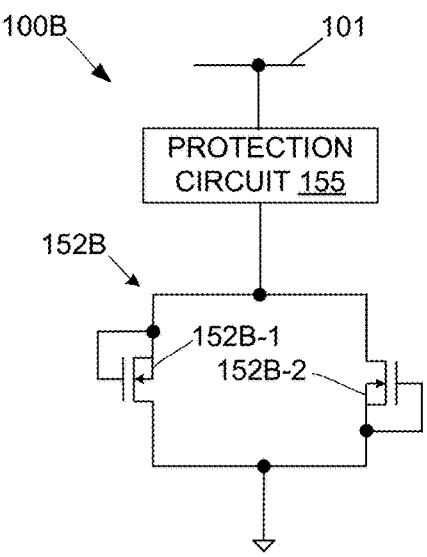

According to alternative practical embodiments, HCE 152 may be implemented using series of back-to-back diodes or CMOS devices (e.g., field effect transistors (FETs)) configured to function as diodes. For example, FIG. 2(A) shows a partial RF circuit 100A including a non-linear shunt circuit 150A coupled between a main signal line 101A and the ground potential according to any of the configurations set forth above, where non-linear shunt circuit 150A includes an HCE 152A formed by back-to-back diodes 152A-1 and 152A-2 connected to generalized protective circuit 155. FIG. 2(B) shows another partial RF circuit 100B including a non-linear shunt circuit 150B that is also connected by way of generalized protective circuit 155 between a main signal line 101B and the ground potential, where non-linear shunt circuit 150B includes an HCE 152B formed by FETs 152B-1 and 152B-2 that are configured by way of drain-to-gate connections to implement parallel back-to-back diodes. Other configurations, some of which being described below, may be utilized to implement HCE 152 (FIG. 1), and therefore the claims are not limited by the examples of FIGS. 2(A) and 2(B) unless specified in the claims. In all cases, HCE 152 is configured to cancel third harmonics generated on main signal line 101 by operation of RF switch 130. The impedance of the series combination of the protection circuit and HCE elements represent a much higher impedance path than the main switch devices so that the primary RF signal is not substantially affected.

Note that FIGS. 2(A) and 2(B) respectively depict portions of RF circuits 100A and 100B showing non-linear shunt circuits 150A and 150B coupled between main signal line 101I and ground. It is understood that main signal lines 101A and 101B in these figures are coupled between a transmitter/receiver circuit and an antenna by way of an RF switch in the manner shown and described with reference to FIG. 1. These additional circuit portions are omitted from FIGS. 2(A) and 2(B) for brevity. This simplification is also utilized in the figures associated with the additional exemplary embodiments described below.

Figure 3A:
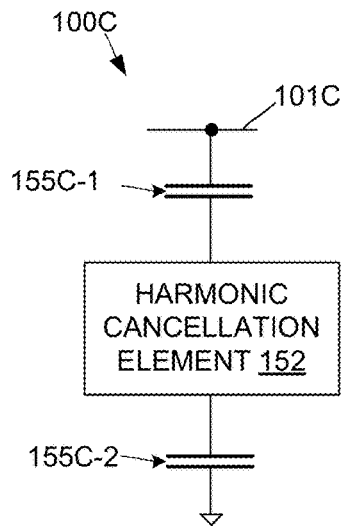
FIGS. 3(A), 3(B), 3(C) and 3(D) are simplified diagrams showing partial RF circuits showing alternative protection circuits according to alternative exemplary embodiments.

Referring again to FIG. 1, in the generalized embodiment optional protection circuit 155 functions to provide a high impedance path through HCE 152 between main signal line 101 and ground that is independent of a frequency (f) of RF signal RX/TX. When utilized, protection circuit(s) 155 provides comparable or higher impedance than that provided, for example, by the shunt branch of an RF circuit, thereby protecting HCE 152 from high voltage levels generated on main signal line 101. As indicated in FIG. 3(A), in some embodiments at least two protection circuits 155C-1 and 155C-2 are utilized, with first protection circuit 155C-1 coupled between HCE 152 and main signal line 101C, and second protection circuit 155C-2 coupled between HCE 152 and ground. In other embodiments (e.g., the embodiment described below with reference to FIG. 7), the function of the optional protection circuit is implemented using the shunt branch of an associated RF switch.

Figure 3B:
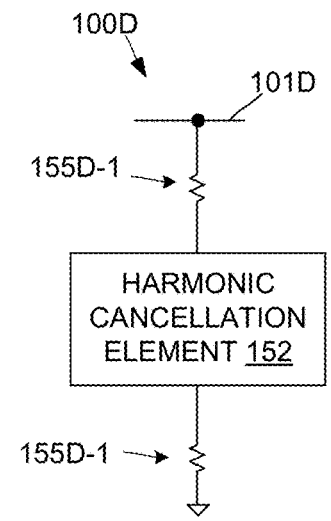
Figure 3C:
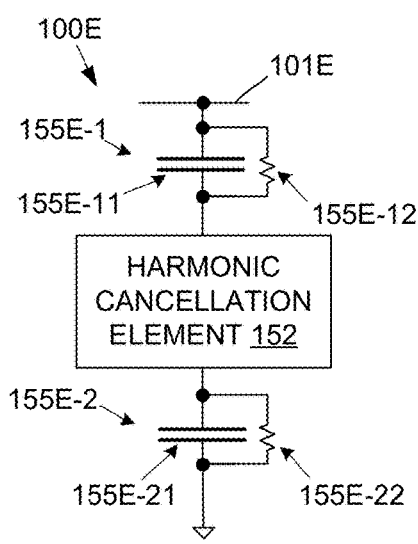

According to one set of embodiments, optional protection circuit 155 (FIG. 1) is implemented using one or more passive elements. For example, FIG. 3(A) depicts a partial RF circuit 100C including first and second protection circuits implemented by capacitors 155C-1 and 155C-2. FIG. 3(B) depicts another partial RF circuit 100D including a pair of protection circuits implemented by high value (e.g., in the range of 2 KOhm and 25 KOhm) resistors 155D-1 and 155D-2, with resistor 155D-1 coupled between HCE 152 and main signal line 101D, and resistor 155D-2 coupled between HCE 152 and ground. FIG. 3(C) depicts another partial RF circuit 100E in which protective circuits 155E-1 and 155E-2 are implemented as R-C networks (e.g., protective circuit 155E-1 includes a capacitor 155E-11 and a resistor 155E-12 connected in parallel between HCE 152 and main signal line 101E, and protective circuit 155E-2 includes a capacitor 155E-21 and a resistor 155E-22 connected in parallel between HCE 152 and ground).

Figure 3D:
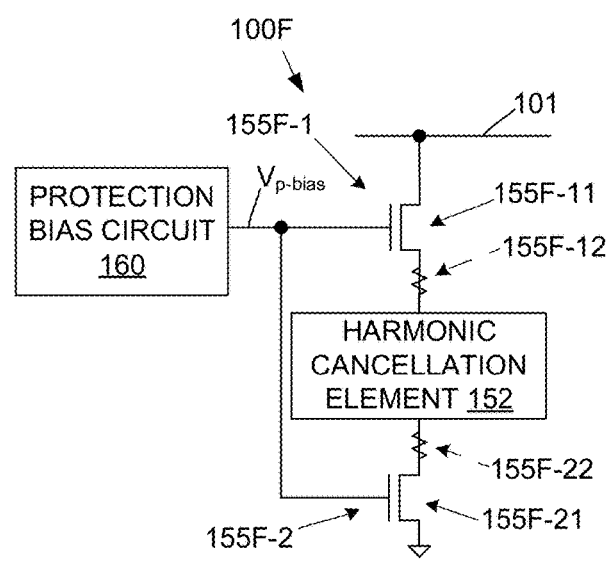

According to another approach, optional protection circuit 155 (FIG. 1) is implemented using one or more FETs or other actively controlled circuit elements. For example, FIG. 3(D) shows a partial RF circuit 100F including a pair of protection circuits 155F-1 and 155F-2 that are implemented by FETs 155F-11 and 155F-12, with FET 155F-11 coupled between HCE 152 and main signal line 101F, and FET 155F-21 coupled between HCE 152 and ground. FETs 155F-11 and 155F-21 are controlled by a protection bias voltage $V_{p\text{-}bias}$ generated by protection bias circuit 160, which is configured using known techniques to generate protection bias voltage $V_{p\text{-}bias}$ at a voltage level that maintains FETs 155F-11 and 155F-21 in a substantially turned-off (low conduction) state. This approach facilitates tuning the impedance applied to HCE 152 by way of adjusting the conductive state of FETs 152F-11 and 152F-21 by way of adjusting the voltage level of protection bias voltage $V_{p\text{-}bias}$, thereby facilitating variance of the power level at which harmonic cancellation is achieved by the non-linear shunt circuit. In an alternative embodiment, passive circuit elements (e.g., resistors 155F-12 and 155F-22) may be included in series with the actively controlled circuit elements to provide additional impedance tuning control.

Figure 4:
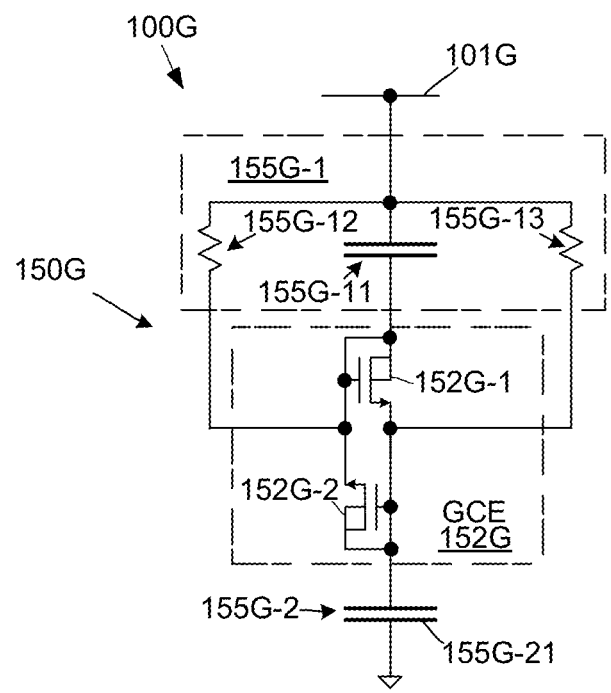
FIG. 4 is a simplified diagram showing a partial RF circuit including a combined HCE and protection circuit configuration according to an exemplary specific embodiment.
Figure 5:
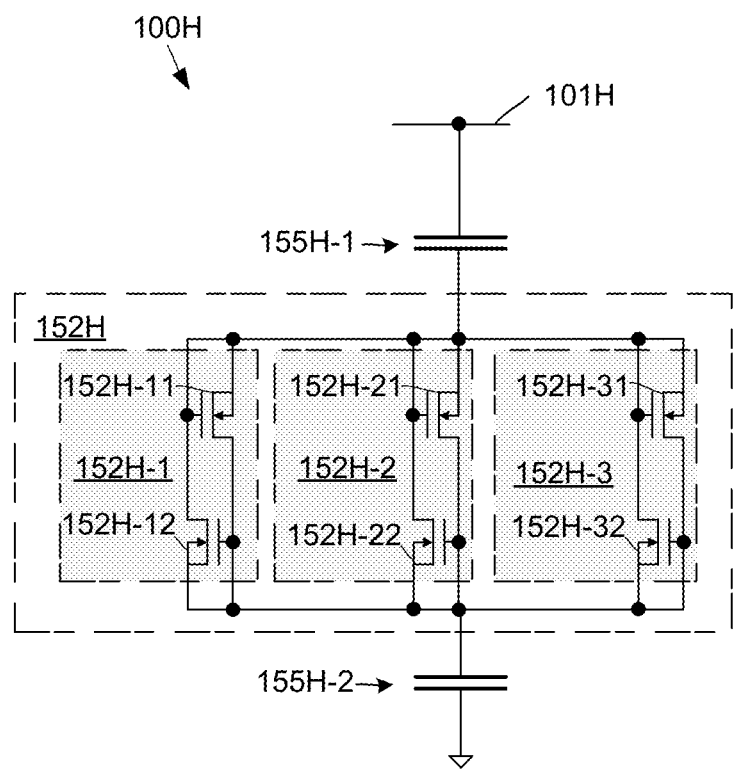
FIG. 5 is a simplified diagram showing a partial RF circuit including a combined HCE and protection circuit configuration according to an exemplary specific embodiment.

FIG. 4 shows a partial RF circuit 100G according to another exemplary embodiment in which the protection circuit elements and HCE elements are connected to enhance protection of the HCE. In this case, HCE 152G includes gate-to-drain-connected FETs 152G-1 and 152G-2 that are coupled between an upper protection circuit 155G-1 and a lower protection circuit 155G-2. Upper protection circuit 155G-1 includes a first capacitor 155G-11, a first resistor 155G-12 connected between main signal line 101G and a gate terminal of (first) FET 152G-1, and a second resistor 155G-13 connected between main signal line 101G and a gate terminal of (second) FET 152G-2. Lower protection circuit 155G-2 includes a second capacitor 155G-21 that is coupled between HCE 155G and ground. During operation, capacitors 155G-11 and 155G-21 function as described above, and resistors 155G-12 and 155G-13 function to control the gate voltage applied to FETs 152G-1 and 152G-2 in a way that affects the voltage applied across HCE 152G. By way of varying the size of resistors 155G-12 and 155G-13, the embodiment of FIG. 5 provides another degree of freedom that can be used to tune non-linear shunt circuit 150G to provide harmonic cancellation for RF circuit 100G. Other factors that can be modulated in this example are the size of the FETs or diodes used to form HCE 152G, and the turn-on voltage of the HCE element itself. That is, customized HCE devices can be created in the technology that provides the desired third harmonic response.

FIG. 5 shows a partial RF circuit 100H according to another exemplary embodiment in which the HCE is configured using multiple pairs of back-to-back-connected diodes that are connected in parallel between the main signal line and ground. In the depicted exemplary embodiment, HCE 152H is connected between capacitor-type protection circuits 155H-1 and 155-H2, and include three back-to-back connected diode pairs 152H-1, 152H-2 and 152H-3. According to the present embodiment, diode pairs 152H-1, 152H-2 and 152H-3 are implemented using FETs connected in a gate-to-drain configuration, where each pair of FETs is configured such that the corresponding diode pair becomes effective at a unique (different) power level. For example, diode pair 152H-1 is implemented by FETs 152H-11 and 152H-12 that are configured using known techniques to turn on when the voltage on the main RF line is lower (e.g., 20V), diode pair 152H-2 is implemented by FETs 152H-21 and 152H-22 that are configured to turn on when the voltage on the main RF line is higher (e.g., 30V), and diode pair 152H-3 is implemented by FETs 152H-31 and 152H-32 that are configured to turn on at an intermediate voltage on the main RF line (e.g., 25V). With this configuration, the effectiveness of HCE 152H is extended to function over a wider range of the switch input power levels.

Figure 6:
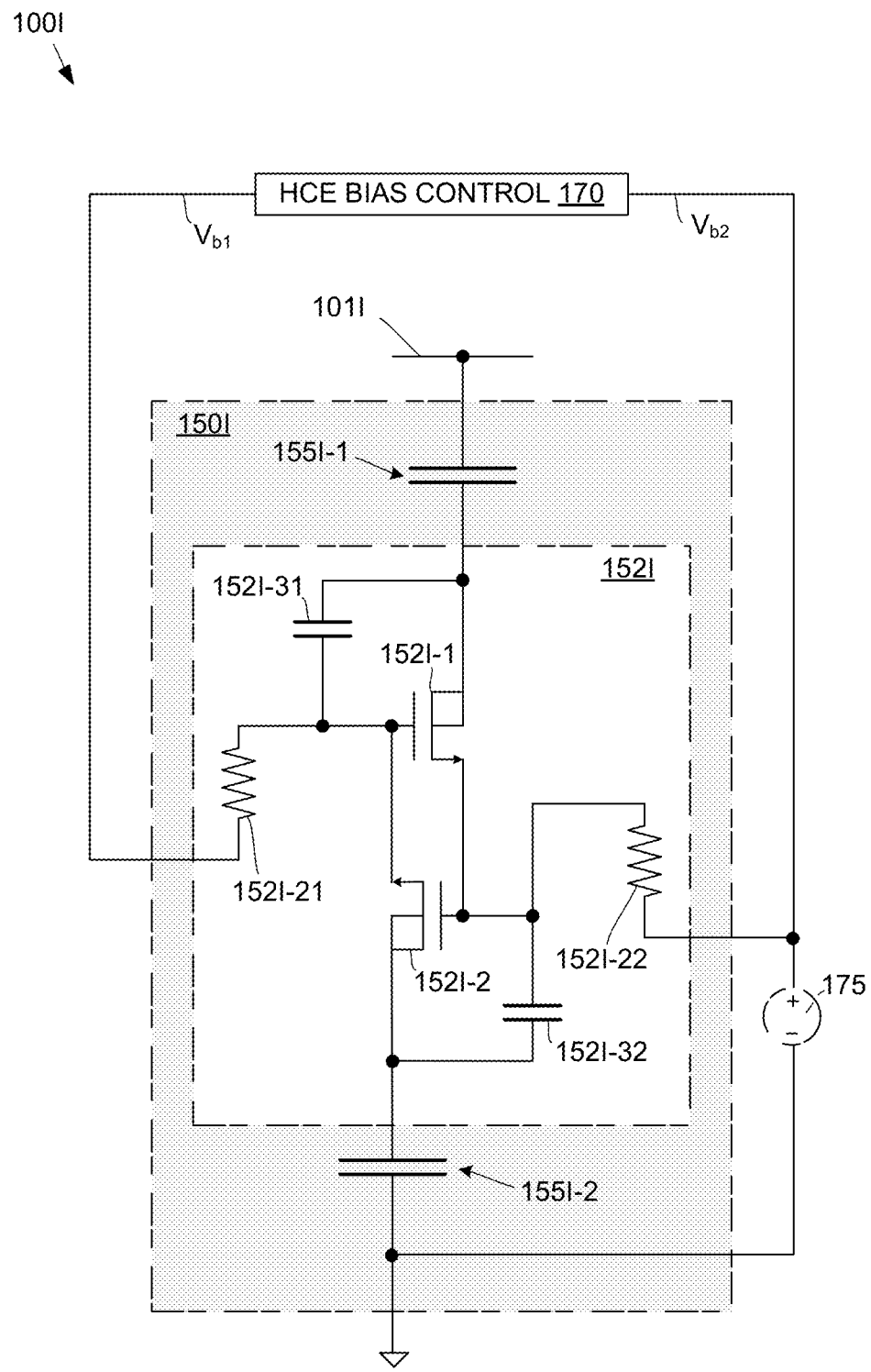
FIG. 6 is a simplified schematic diagram showing a partial RF circuit including a non-linear shunt circuit having an actively biased HCE according to another exemplary embodiment of the present invention.

FIG. 6 shows a partial RF circuit 100I including a non-linear shunt circuit 150I including an actively biased HCE 152I according to another exemplary embodiment of the present invention. The inventors determined that the shunt-type configuration introduced by the present invention supports the use of very high impedance protection circuits that, in turn, facilitate active direct current (DC) biasing of the HCE diode turn-on voltages, thereby effectively tuning the HCE to achieve harmonic cancellation over a wider switch power range. In the practical embodiment depicted in FIG. 6, this active DC biasing is achieved by implementing HCE 152I using FETs (transistors) 152I-1 and 152I-2 connected in a diode configuration (i.e., with the drain terminal of FET 152I-1 connected to the gate terminal of FET 152I-2, and the drain terminal of FET 152I-2 connected to the gate terminal of FET 152I-1) with the gate terminals of FETs 152I-1 and 152I-2 respectively coupled to receive HCE bias voltages $V_{b1}$ and $V_{b2}$. In addition, non-linear shunt circuit 150I includes an upper protection circuit (first high value capacitor) 155I-1 and a lower protection circuit (second high value capacitor) 155I-2 that are connected in series with HCE 152I, with capacitor 155I-1 coupled between main signal line 101I and the source terminal of FET 155I-1 (i.e., the upper/first terminal of HCE 152I), and capacitor 155I-2 coupled between the source terminal of FET 155I-2 (i.e., the lower/second terminal of HCE 152I) and ground.

Referring to the upper portion of FIG. 6, in addition to non-linear shunt circuit 150I and the other circuitry mentioned above (not shown), RF circuit 100I includes an HCE bias control circuit 170 that is configured using known techniques to generate HCE bias voltages $V_{b1}$ and $V_{b2}$ at DC voltage levels corresponding to desired power ranges over which HCE 152I is to be operated. In alternative embodiments, HCE bias control circuit 170 is implemented using one or more of a DC voltage source, an operational amplifier, a digital-to-analog converter, and a digital-to-analog converter with a temperature dependent reference. In one embodiment, HCE bias voltages $V_{b1}$ and $V_{b2}$ have the same voltage level (i.e., the same DC bias voltage is applied to the gate terminals of both FETs 152I-1 and 152I-2. Those of ordinary skill in the art will appreciate that HCE bias control circuit 170 may comprise any circuitry capable of applying a controlled DC voltage without departing from the principles of the present invention.

Various additional circuit elements may be utilized to further enhance the active biasing operation. In one embodiment HCE bias voltages $V_{b1}$ and $V_{b2}$ are applied to the gate terminals of FETs 152I-1 and 152-I2 by way of high value resistors 152I-21 and 152I-22, respectively, connected between said HCE bias control circuit 170 and said gate terminals of FETs 152I-1 and 152I-2, where resistors 155I-21 and 155I-22 are configured (sized) to provide RF blocking. Optional coupling capacitors and 152I-32 are respectively connected between the gate terminals of FETs 152I-1 and 152I-2 and associated HCE bias voltages $V_{b1}$ and $V_{b2}$ to prevent direct DC biasing of main signal line 101I. A small voltage potential 175 is optionally utilized to bias the body of lower (assist) FET 152I-2 in order to achieve harmonic cancellation over a wider power range.

Figure 7:
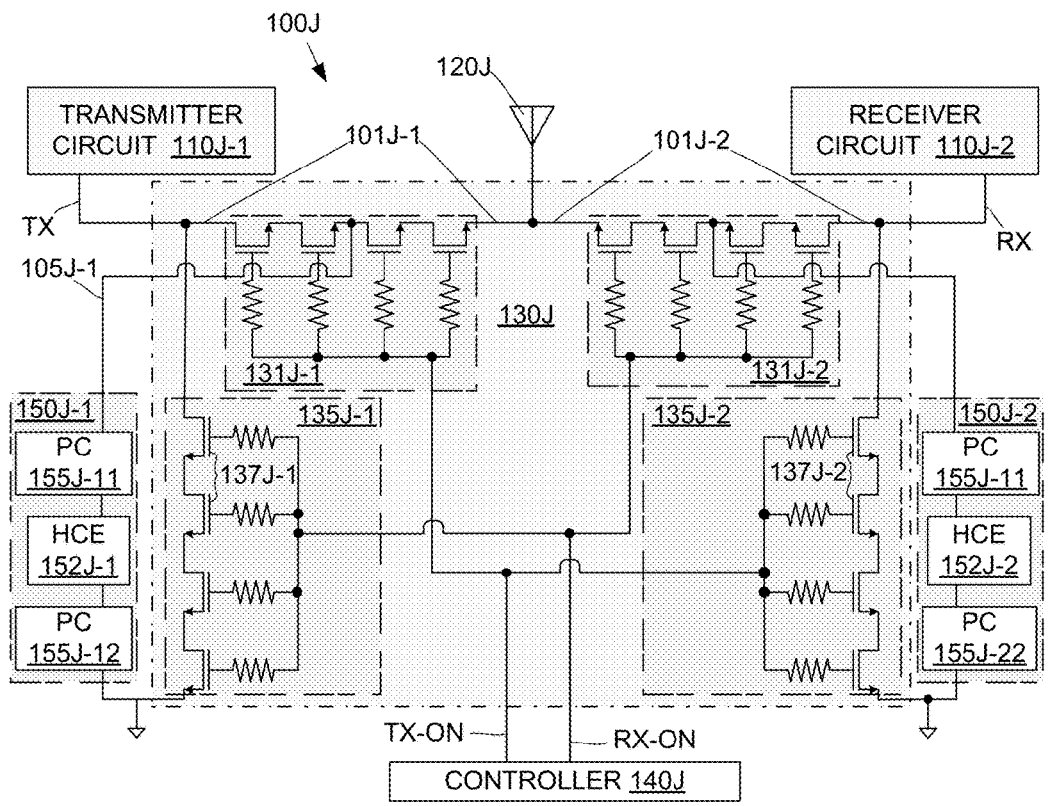
FIG. 7 is a simplified schematic diagram showing a partial RF circuit including non-linear shunt circuits placed parallel to corresponding shunt branches of an RF circuit according to another exemplary embodiment of the present invention.

FIG. 7 depicts another RF circuit 100J including a single-pole, double throw (SPDT) RF switch 130J having two series branches 131J-1 and 131J-2 and two shunt branches 135J-1 and 135J-2. Specifically, series branch 131J-1 is configured as described above and is coupled between a transmitter circuit 110J-1 and an antenna 120J by way of a first main signal line 101J-1 and is controlled by switch control signal TX-ON, and series branch 131J-2 is coupled between a receiver circuit 110J-2 and antenna 120J by way of a second main signal line 101J-2 and is controlled by switch control signal RX-ON. Shunt branch 135J-1 includes series-connected FETs 137J-1 that are coupled between main signal line 110J-1 and ground and are controlled by switch control signal RX-ON, and shunt branch 135J-2 includes series-connected FETs 137J-2 that are coupled between main signal line 110J-2 and ground and are controlled by switch control signal TX-ON. With this arrangement, shunt branch 135J-1 is turned on when series branch 131J-1 is turned off by way of asserting switch control signal RX-ON and de-asserting switch control signal TX-ON, whereby any charge on main signal line 101J-1 is passed to ground by way of shunt branch 135J-1. Conversely, shunt branch 135J-2 is turned on when series branch 131J-2 is turned off by way of asserting switch control signal TX-ON and de-asserting switch control signal RX-ON, whereby any charge on main signal line 101J-2 is passed to ground by way of shunt branch 135J-2.

According to the embodiment depicted in FIG. 7, RF circuit 100J includes two non-linear shunt circuits 150J-1 and 150J-2 that are physically positioned (placed) adjacent to and connected in parallel with shunt branches 135J-1 and 135J-2, respectively. Specifically, non-linear shunt circuit 150J-1 includes an HCE 152J-1 coupled between protection circuits 155J-11 and 155J-12 between main signal line 110J-1 and ground, wherein the circuit elements forming non-linear shunt circuit 150J-1 are fabricated in a chip area located immediately adjacent to the chip area occupied by series-connected FETs 137J-1. Similarly, non-linear shunt circuit 150J-2 includes an HCE 152J-2 coupled between protection circuits 155J-21 and 155J-22 between main signal line 110J-2 and ground, and the circuit elements forming non-linear shunt circuit 150J-2 are fabricated in a chip area located immediately adjacent to the chip area occupied by series-connected FETs 137J-2. Placing non-linear shunt circuits 150J-1 and 150J-2 adjacent to associated switch shunt branches 135J-1 and 135J-2 minimizes the amount of additional chip area required to implement the shunt-type harmonic cancellation approach of the present invention.

Figure 8:
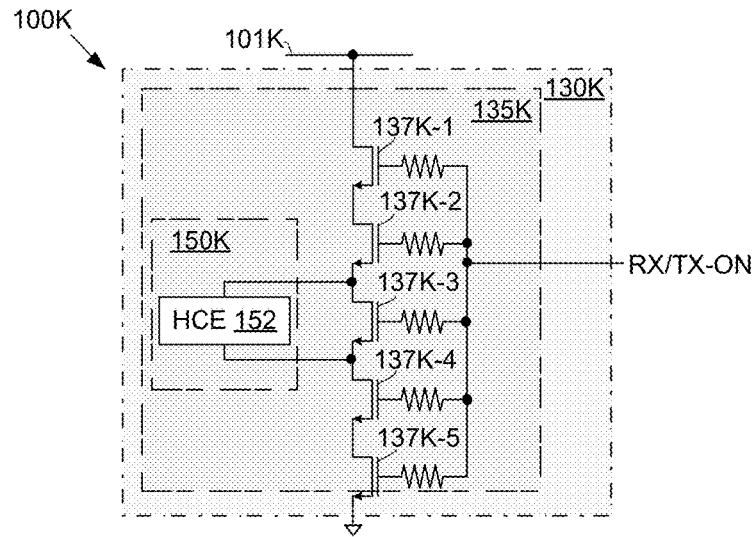
FIG. 8 is a simplified schematic diagram showing a partial RF circuit including a non-linear shunt circuit integrated with the shunt branch of an RF switch according to another exemplary embodiment of the present invention.

FIG. 8 depicts another partial RF circuit 100K including a shunt branch 135K of another SPDT RF switch 130K (the two series branches and the second shunt branch are omitted for brevity). In this embodiment, shunt branch 135K includes series connected FETs 137K-1 to 137K-5 that are controlled by a corresponding switch control signal RX/TX-ON to selectively pass voltages from main signal line 101K to ground in the manner described above. According to the present embodiment a non-linear circuit 150K is integrated within shunt branch 135K by way of connecting HCE 152K in parallel with FET 137K-3. During operation, RF switch shunt branch FETs 137K-1 to 137K-5 are turned off when the corresponding series branch of RF switch 130K is turned on, whereby shunt branch FETs 137K-1, 137K-2, 137K-4 and 137K-5 serve the role of protection circuits to limit voltage across the HCE 152K during harmonic cancellation operations. When RF switch shunt branch FETs 137K-1 to 137K-5 are turned on (i.e., when the corresponding series branch of RF switch 130K is turned off), voltage/current is passed from main signal line 101K to ground by way of FETs 137K-1 to 137K-5, whereby HCE 152K is bypassed by conduction through parallel-connected shunt branch FET 137K-3. Integrating non-linear shunt circuit 150K into shunt branch 135K in this manner provides even further space-saving advantages (i.e., by way of reducing the size of non-linear shunt circuit 150K through obviating the need for separate protection circuits).

Although not illustrated, another embodiment similar to that shown in FIG. 8 may include forming a non-linear shunt circuit with protection circuits configured to perform the function of a switch shunt branch, whereby the space savings achieved by the embodiment of FIG. 8 may be realized using this alternative approach.

Figure 9:
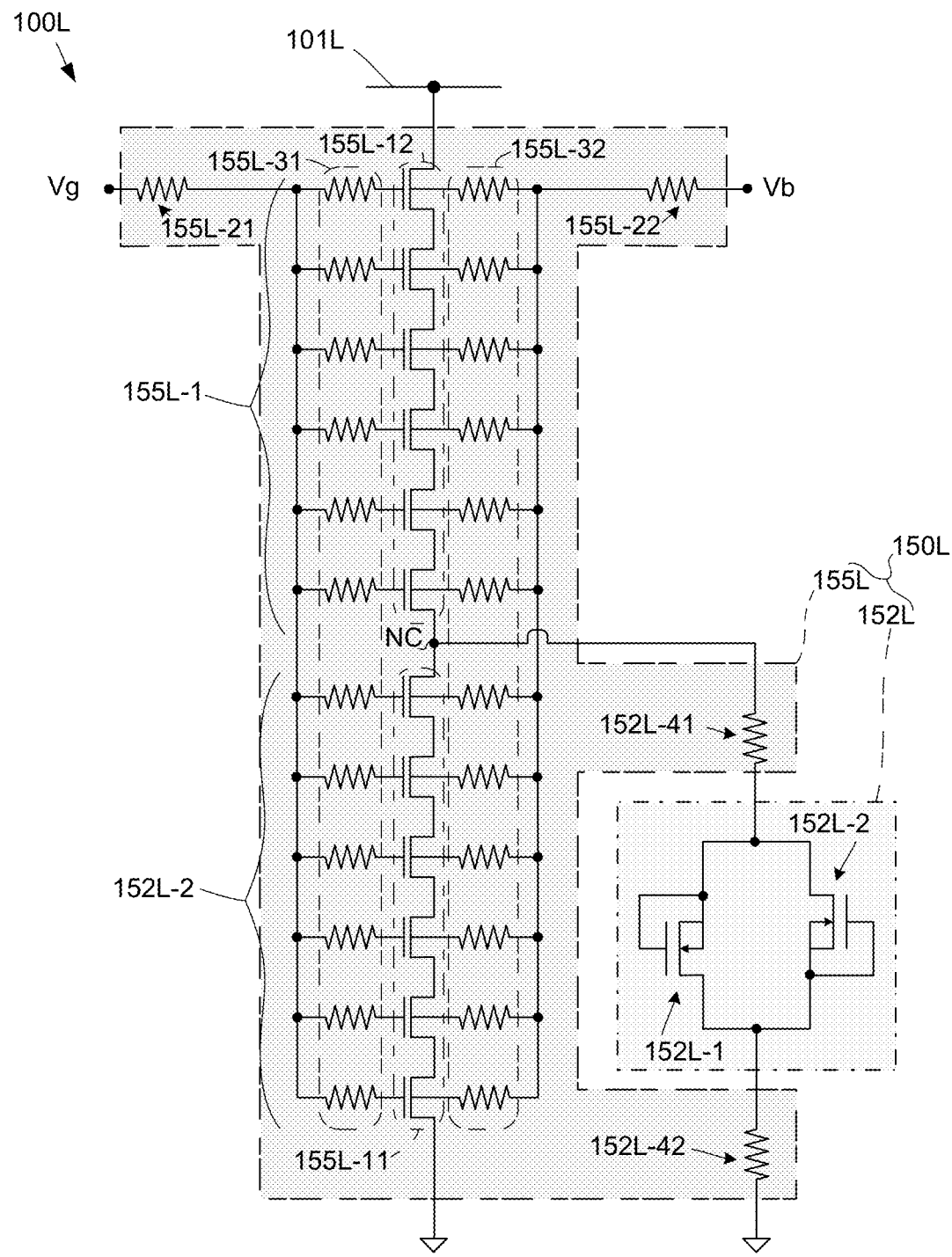
FIG. 9 is a simplified schematic diagram showing a partial RF circuit including a non-linear shunt circuit including a native FET HCE according to another exemplary embodiment of the present invention.

FIG. 9 depicts a partial RF circuit 100L in which a non-linear shunt circuit 150L includes an HCE 152L and a protection circuit 155L. Protection circuit 155L is implemented in two circuit portions 155L-1 and 155L-2 using a combination of twelve series-connected FETs (circuit devices) and associated resistors, where the twelve-series connected FETs are divided into two groups of six, each group being associated with an associated protective circuit portion. Specifically, a first protective circuit portion 155L-1 includes an upper group 155L-11 of six FETs connected in series between main signal line 101L and a central node NC, and a lower group 155L-12 includes six FETs connected in series between central node NC and ground. A gate bias voltage Va is supplied to the gate terminals of the twelve FETs in groups 155L-11 and 155L-12 by way of associated resistors 155L-21 and 155L-31, and the bodies of the twelve FETs in groups 155L-11 and 155L-12 are coupled to body bias voltage Vb by way of associated resistors 155L-22 and 155L-32. Central node NC is coupled to HCE 152L by way of an upper resistor 152L-41, and an additional resistor 152L-42 is coupled between HCE 152L and ground. HCE 152L is implemented using native (low threshold voltage) FETs 152L-1 and 152L-2 connected in a back-to-back (diode) configuration between resistors 155L-41 and 155L-42, whereby HCE 152L is effectively connected in parallel with lower PC FET group 155L-11. The threshold voltage of native FETs 152L-1 and 152L-2, along with the impedance of protection circuit 155L, determines the range of input power over which HCE 152L is effective during operation.

Figure 10:
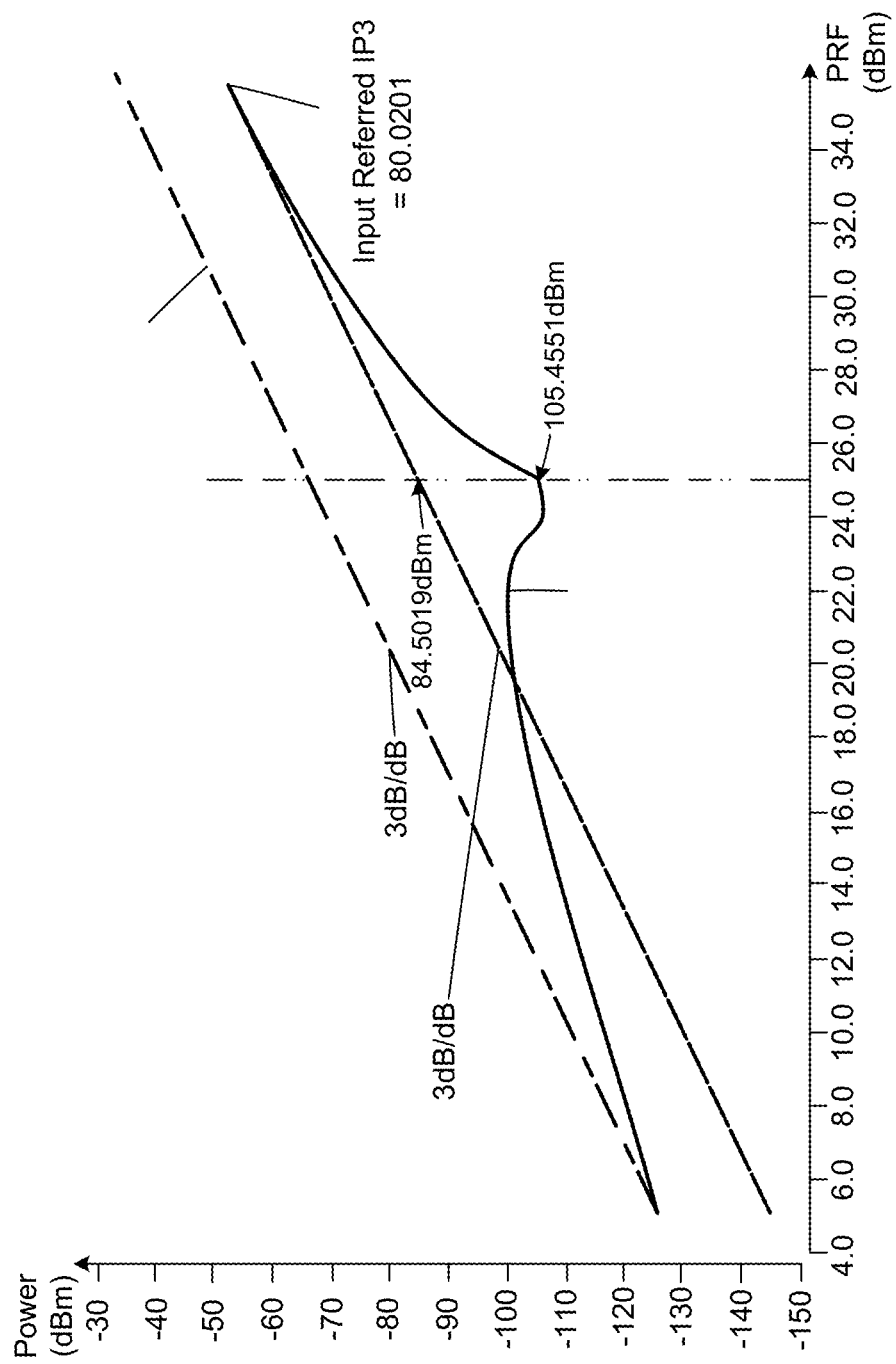
FIG. 10 is a graph depicting simulated data showing improvement in IMD3 provided by the non-linear shunt circuit of FIG. 9.

FIG. 10 is an exemplary graph depicting the effectiveness of the diode-connected FET HCE embodiment described above with reference to FIG. 9. Specifically, FIG. 10 is a graphs depicting SPICE simulations for single pole, single through (SPIT) switches, one switch formed in accordance with RF circuit 100L, and one comprising a conventional configuration, both being based on established RF silicon-on-insulator (RF-SOI) technology. Exemplary gate and body bias voltages Va and Vb are 2.5V and 0V, respectively. In this case, the HCE diode-connected FETs (i.e., 152L-1 and 152L-2, shown in FIG. 10) are low-Vt devices that have a different body implant than those utilized in the main switch device (not shown). The results of a circuit simulation of RF circuit 100L, showing a significant improvement in two-tone third-order intermodulation distortion (IMD3) when two tones with input power 25 dBm are presented to the series switch branch (not shown). In the depicted example, the first applied signal frequency (f1) is 915 MHz, the second applied signal frequency (f2) is 1015 MHz, and IMD3 is measured at 815 MHz. The third order harmonic generated by RF circuit 100L is indicated by the solid line, and the third order harmonic generated using conventional methods is indicated by the dashed line. As indicated along the vertical dashed line, at an IMD3 is reduced by RF circuit 100L by approximately 20 dBm from an equivalent RF circuit configuration that omits non-linear shunt circuit 150L.

Figure 11A:
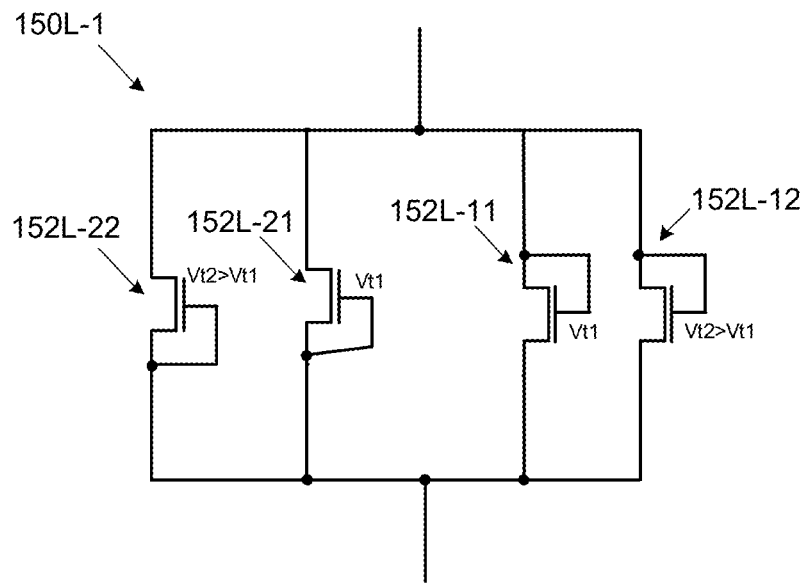
FIGS. 11(A) and 11(B) are simplified schematic diagrams showing alternative HCE configurations utilized in the non-linear shunt circuit of FIG. 9.
Figure 11B:
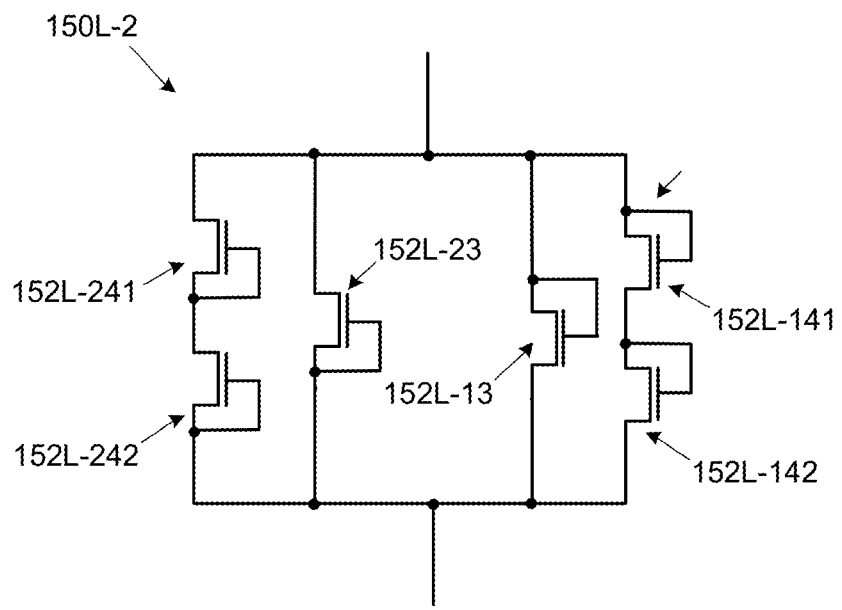
Figure 12:
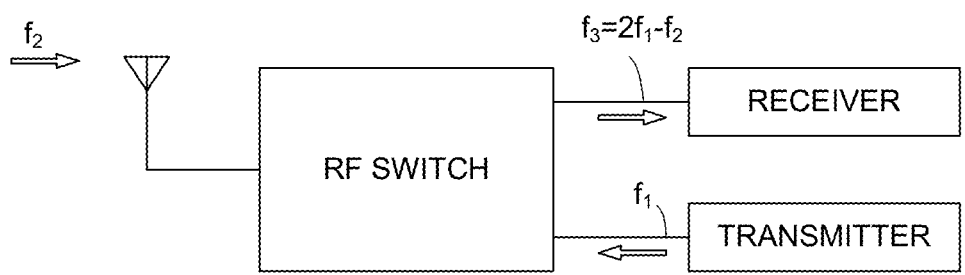
FIG. 12 is a simplified diagram depicting a conventional RF circuit.

Several techniques may be used to broaden the effective input power range of non-linear shunt circuit 150L. For example, the effective input power range may be changed by tuning the impedance of PC FETs 155L-11 and 155L-12, which is easily accomplished by changing the voltage level of gate voltage Va. FIG. 11(A) depicts another alternative approach in which a modified HCE 150L-1 utilizes parallel combinations of native FETs connected as diodes, with each combination of native FETs having a different turn-on voltage in a manner similar to that described above with reference to FIG. 5. For example, the combination of FET 152L-11 and 150L-12, which forms one diode, has a lower turn-on voltage vt1 than the diode turn-on voltage vt2 of the diode formed by the combination of FETs 152L-21 and 152L-22. In this example, at lower input power the devices with lower turn-on voltage (i.e., FETs 152L-21 and 152L-22) provide harmonic cancellation, while at higher voltages the higher turn-on voltage devices (i.e., FETs 152L-11 and 152L-12) are activated. FIG. 11(B) depicts another alternative approach in which a modified HCE 150L-2 includes parallel combinations of HCE FET stacks to achieve different turn on voltages. For example, the parallel stack formed by FETs 152L-141 and 152L-142 produce a higher turn-on voltage than that of FET 152L-13 (i.e., the at higher input power the series stack of two HCE diodes becomes active). As in the previous embodiments, FET 152L-13 is paired with FET 152L-23 to form a first diode, and the parallel stack formed by FETs 152L-141 and 152L-142 is paired with a second parallel stack formed by FETs 152L-241 and 152L-242 to form two diodes.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A radio frequency (RF) circuit comprising:
   a main signal line coupled between a transmitter/receiver circuit and an antenna;
   a RF switch including a series branch operably connected to the main signal line and configured to be operably controlled by a switch control signal such that the series branch selectively passes an RF signal transmitted on the main signal line between the transmitter/receiver circuit and the antenna in accordance with the switch control signal; and
   a non-linear shunt circuit coupled between the main signal line and a ground potential, the non-linear shunt circuit including at least one harmonic cancellation element configured to cancel third harmonics of the RF signal that are generated by the RF switch,
   wherein the non-linear shunt circuit further comprises at least one protection circuit connected in series with the harmonic cancellation element, said at least one protection circuit being configured to generate an impedance that is independent of a frequency of the RF signal, wherein said harmonic cancellation element comprises a first and second field effect transistors connected in a back-to-back configuration, and wherein said at least one protection circuit comprises:

a first capacitor coupled in series with said harmonic cancellation element between said main signal line and said ground potential;

a first resistor connected between said main signal line and a first gate terminal of said first field effect transistor; and a second resistor connected between said main signal line and a second gate terminal of said second field effect transistor.

2. The RF circuit of claim 1, wherein the non-linear shunt circuit is connected by way of a first conductive path to an input node of the RF switch.

3. The RF circuit of claim 1,
wherein the series branch comprises a plurality of series-connected transistors coupled between an input node and an output node of said RF switch, and includes an intermediate node connected between two of said plurality of series-connected transistors, and wherein the non-linear shunt circuit is connected by way of a first conductive path to the intermediate node of the series branch.

4. The RF circuit of claim 1, wherein said at least one protection circuit further comprises a second capacitor coupled between said harmonic cancellation element and said ground potential.

* * * * *